United States Patent Office 3,526,525
Patented Sept. 1, 1970

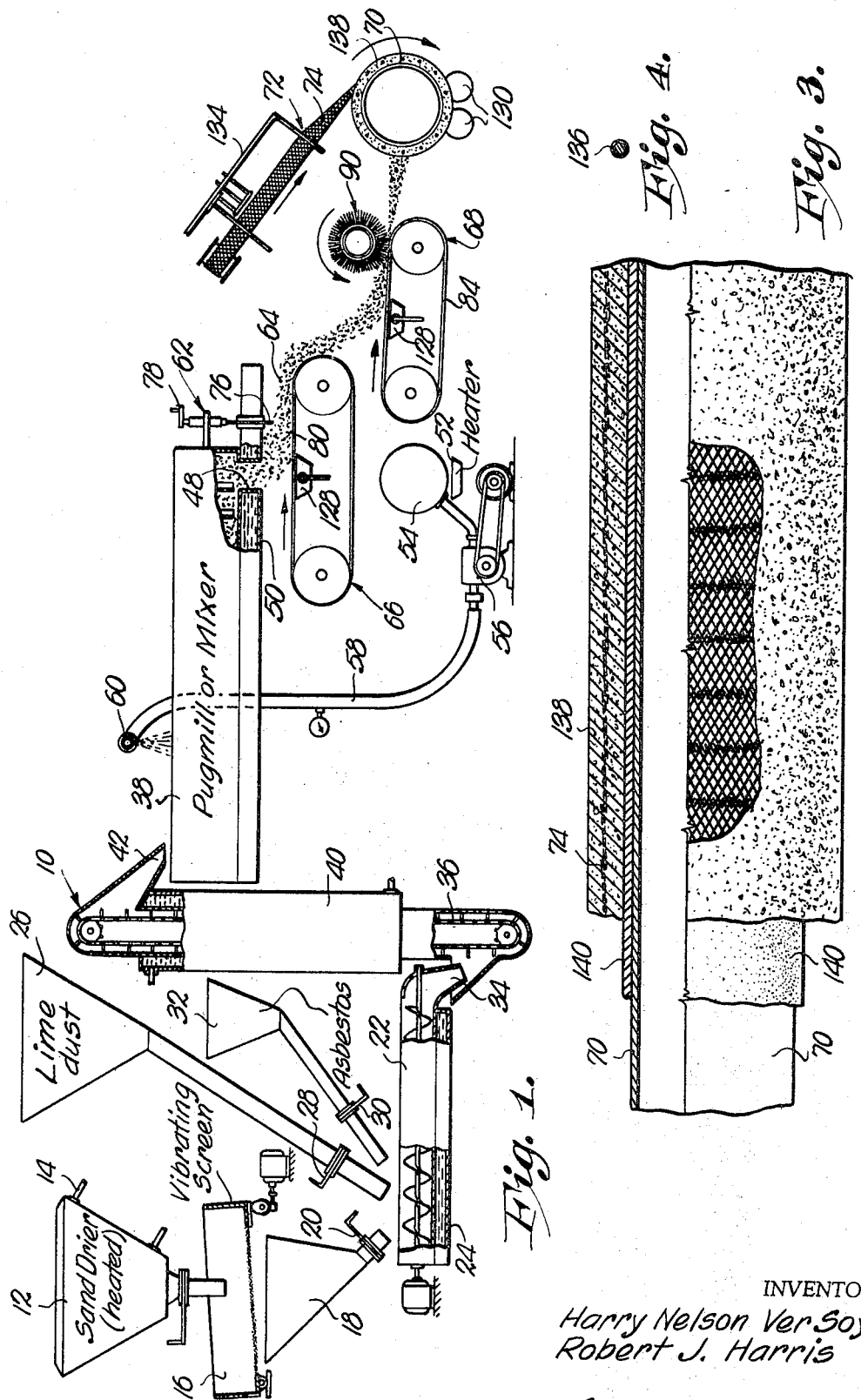

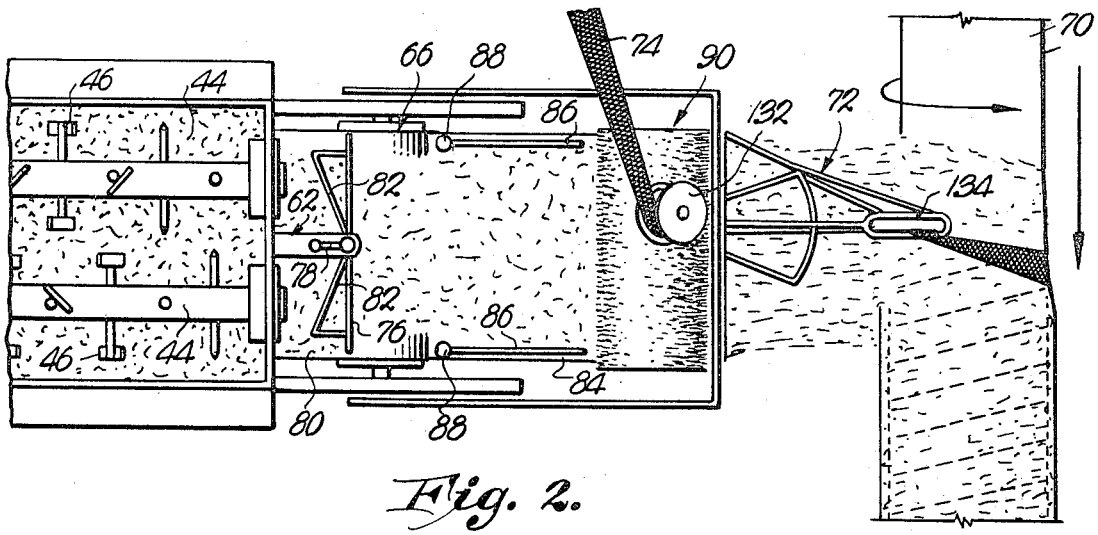
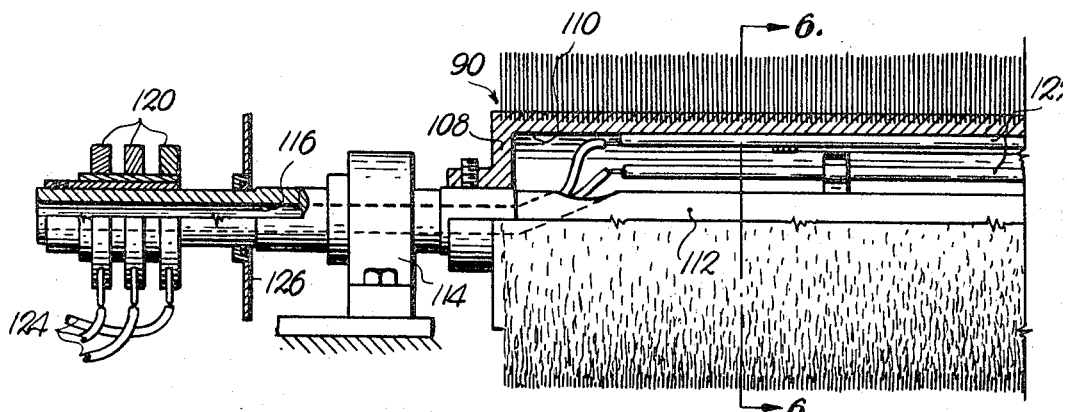
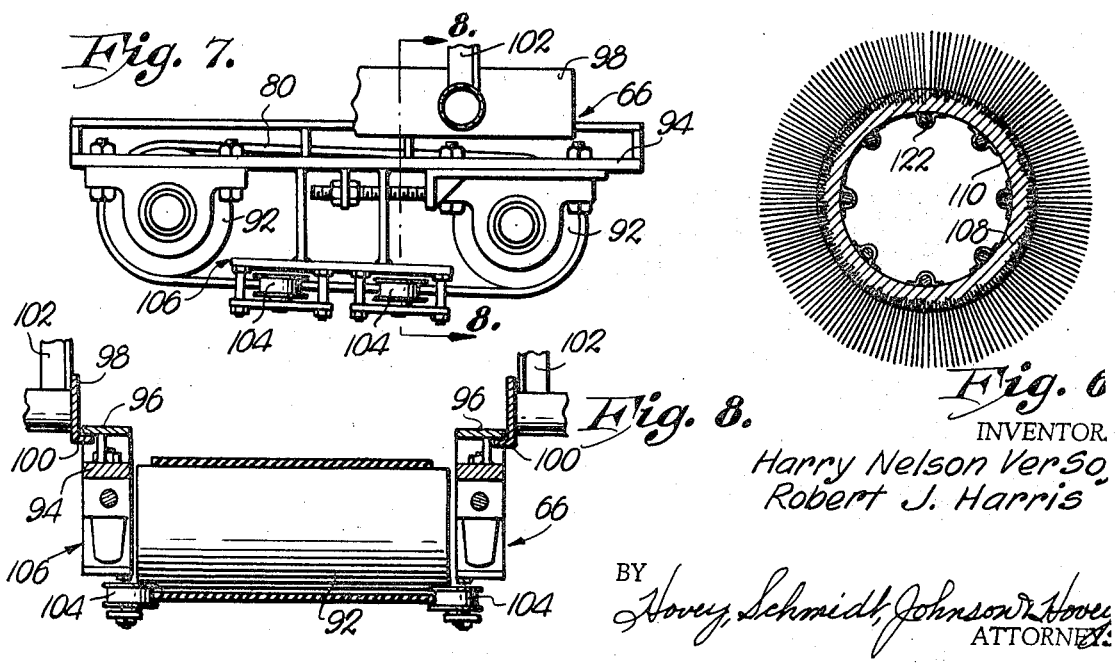

3,526,525
METHOD AND APPARATUS FOR COATING PIPE
Harry Nelson Versoy, New Orleans, and Robert J. Harris, Marrero, La., assignors to H. C. Price Co., Bartlesville, Okla., a corporation of California
Filed Jan. 3, 1967, Ser. No. 606,994
Int. Cl. B44d *1/14, 1/094*
U.S. Cl. 117—18                             16 Claims

ABSTRACT OF THE DISCLOSURE

A method and apparatus for coating a rotating object with a particulate material containing a thermal responsive, liquified binder. Each particle of the material is coated with the heated, plasticized material and the material is passed between a moving and heated conveyor belt and a heated rotating brush to impart high velocity to the particles. Impingement of the particles and plasticized binder on the pipe with impactive force effects cohesive binding of the particles to one another until a relatively dense, compacted layer of the composition is bonded to the object. Cooling of the binder from its plasticized state, if desired, enhances the bond and cohesion of the coating.

---

This invention relates to coating and, more particularly, to a method and apparatus for applying a relatively heavy, flexible, protective coating to objects such as lengths of pipe or the like.

It has long been necessary, particularly for marine pipe laying operations, to coat the joints of pipe to be incorporated into the pipeline with a relatively heavy weight and anticorrosive coating such as concrete or the like. As each coated joint or section of pipe is integrated into the pipeline by welding, the juncture of the pipe sections is also coated to provide the pipeline with a substantially homogenous coating throughout its entire length.

Concrete coatings have proved adequate for many installations but relative inflexibility of the concrete has rendered such coatings inadequate in installations where substantial bending occurs in the pipeline during laying operations. Bending to an extent that it may crack concrete coatings may occur, for example, when a pipeline must be lowered from a lay barge on the surface of a body of water to the ocean floor a substantial distance below. Cracks which may result, lead to failure of the coating and corrosion of the pipe wall often occurs.

Consequently, a more flexible coating in the nature of a relatively thick layer of mastic material has been developed. This material, which provides enhanced pipe preservative characteristics, comprises a bituminous mastic consisting of a heat responsive binder such as asphalt or the like, and a heavy aggregate material. A filler of lime dust or the like may be added to the composition which may also include a small amount of fiber such as asbestos or glass fibers to serve as a reinforcement.

In the past, however, the only successful method of applying such mastic coating material to objects such as joints of pipe involved a relatively slow, expensive extrusion process wherein the material was caused to flow under pressure onto the surface of the pipe as the latter passed through an extrusion coating machine. Such efforts as were made to spray or throw the material onto the pipe (which methods have proved successful in applying concrete coatings) have heretofore failed to produce coatings having sufficient cohesion between the particles to be satisfactory. Further, previous efforts to apply mastic coatings by methods other than the extrusion process yielded coatings which were not compacted to adequate density and which contained voids and were not of uniform consistency throughout.

It is, therefore, the primary object of this invention to provide a method and apparatus for applying a mastic coating to objects such as joints of pipe by a quick and relatively inexpensive process which provides a dense, stable, uniform and relatively flexible preservative and weight coating.

In the achievement of the foregoing object it is another important object of the instant invention to provide a method and apparatus wherein each particle of aggregate becomes thoroughly coated with binder material, yet the composition retains a granular consistency until it is applied to the object so that the composition may be built up into a coating by high speed and relatively inexpensive techniques.

A further object of this invention is to provide a method and apparatus for coating objects with mastic material by impingement of the material on the object wherein the particles of the coating composition are cushioned upon high velocity impact against the object to minimize recoil or bounce of the particles from the object.

These and other important objects of this invention will be further explained or will become apparent from the following specification and claims.

In the drawings:

FIG. 1 is a diagrammatic, side elevational view on a reduced scale of a plant layout illustrating apparatus for applying mastic coatings to pipe pursuant to the principles of this invention, parts being broken away and shown in cross section to reveal details of construction;

FIG. 2 is a fragmentary, top plan view of the pug mill and coating applicator, the cover of the pug mill having been removed to reveal details of construction;

FIG. 3 is a fragmentary, side elevational view of a joint of coated pipe, portions being broken away and appearing in cross section to reveal details of construction;

FIG. 4 is an enlarged, vertical, cross-sectional view through a reinforcement wire illustrating the electrical nonconductive coating thereon;

FIG. 5 is an enlarged, fragmentary, front elevational view of the applicator brush and mounting assembly illustrating the heater unit, parts being broken away and appearing in cross section to reveal details of construction;

FIG. 6 is a vertical, cross-sectional view taken along line 6—6 of FIG. 5;

FIG. 7 is a fragmentary, side elevational view of the conveyor belt assembly; and FIG. 8 is a cross-sectional view taken along line 8—8 of FIG. 7.

Referring initially to FIG. 1, a plant 10 constructed pursuant to the principles of this invention and capable of carrying out the method of coating objects such as pipe or the like to be described, includes as a component a sand drier 12 capable of heating the particulate material to a temperature to insure that all of the moisture contained in the material is driven off prior to mixing the sand or particulate material with the other components of the coating composition.

To this end, the hopper of the sand drier may be provided with a jacket which is provided with a heating fluid such as oil or the like through conduits 14 to maintain the sand at the desired elevated temperature. A vibrating screen 16 receives the sand from the dried 12 to remove trash and foreign material from the sand, and also to insure that the particulate material not contain particles greater than a predetermined size. The screened material is received in a hopper 18 for passage through a metering device 20 into a mixing screw 22. The latter is provided with a heating fluid jacket 24 to maintain the materials received within screw 22 at a desired temperature level.

Lime dust from hopper 26 provides a filler material for the coating composition and is metered by a device 28 for admixing to the composition in screw 22. A fiber to provide reinforcement for the composition is metered through a device 30 from a hopper 32 and is received in screw 22 for mixing with the particulate matter and lime dust. This mixture then passes through outlet 34 and into an elevator 36 for movement to a pug mill 38. As illustrated, elevator 36 is also provided with a heating fluid jacket 40 so that the dry components of the composition which have been thoroughly mixed and agitated in screw 22 retain the desired temperatures before emanating from the elevator discharge 42 and into the pug mill 38. The latter may comprise a plurality of longitudinally extending shafts 44 having inclined vanes 46 mounted thereon as shown best in FIG. 2. Means (not shown) rotate shafts 44 to effect a thorough admixing of the composition materials while advancing the materials longitudinally of the pug mill in the direction of the outlet 48. The pug mill 38 is likewise provided with a heating fluid jacket 50 suitable for controlling the temperature of the materials within the mill.

A thermoplastic binder which may be asphalt or other bituminous-based, heat responsive material is heated to a liquid state by heater 52 associated with a source 54 and is moved by a pump 56 through a conduit 58 to a spray bar 60 extending transversely across pug mill 38 and having orifices to permit discharge of the binder material onto the constantly agitated mass of dry components of the coating mixture. It should be noted that the binder material is sprayed onto the dry components in relatively close proximity to the inlet end of the pug mill to insure a thorough admixing of the components of the composition as the latter is transferred longitudinally of the pug mill toward the outlet 48. Metering structure 62 associated with outlet 48 insures a uniform flow of the coating composition designated 64 onto a conveyor 66 for transporting the composition 64 to an applicator unit 68. The latter imparts a relatively high velocity to the granules of the composition and directs the composition toward an object 70 to be coated. Apparatus 72 is provided for applying a reinforcement 74 to the layer of coating composition as the latter is applied to the object 70.

It is important that the material emanating through outlet 48 be conveyed to unit 68 at a rate of flow which is as uniform as possible and the cross section through the flow stream should be substantially rectangular so that the application of the coating material to the object 70 may proceed in a uniform manner to achieve a relatively smooth, highly compact layer of coating material having uniform thickness throughout the circumference of the object 70 and longitudinally along the latter. To this end, structure 62 includes a vertically reciprocable gate 76 which may be manipulated by a hand crank 78 for raising or lowering the latter a predetermined distance above the endless conveyor belt 80 of conveyor 66. The bottom edge of gate 76 serves as an evener to level the stream of coating composition as the latter gravitates to the upper surface of belt 80.

A pair of rearwardly converging, outwardly extending vanes 82 mounted on the rear surface of gate 76 cooperate to move the material toward the outer edges of belt 80 before the material passes beneath the bottom edge of gate 76, thereby insuring a uniform cross section to the material as the latter gravitates off the forward end of conveyor 66 and onto the upper surface of an endless belt 84 comprising an integral part of applicator unit 68, A pair of side vanes 86 (FIG. 2) overlying the upper surface of belt 84 and swingable on vertically extending pivot posts 88, serve as guides to prevent the material from falling off belt 84 as the latter is moved in a direction toward object 70. Vanes 86 may be adjusted to converge, if desired, to impart any desired width dimension to the flow of material on unit 68.

A rotary brush broadly designated 90 is coupled with a prime mover (not shown) for driving the latter in a counterclockwise direction as viewed in FIG. 1 in timed relationship with respect to the speed of belt 84 whereby the composition material on the latter passes between brush 90 and belt 84 for imparting sufficient velocity to the particles of composition for spraying the latter toward object 70 whereby the composition particles impinge on the object to form the coating as will be hereinafter explained.

Referring now to FIGS. 7 and 8 in conjunction with FIG. 1, the conveyor 66 comprises a pair of spaced, relatively adjustable roller assemblies 92 which receive therearound the conveyor belt 80. Assemblies 92 are mounted on a framework 94 which includes outwardly extending flanges 96 on either side of the framework 94. Generally L-shaped sides 98 have inwardly extending, lowermost flanges 100 which cooperate with flanges 96 for supporting conveyor 66 on a main support frame 102. The sides 98 thereby serve to confine the material which gravitates through outlet 48 onto the upper surface of belt 80 as the material is conveyed to the applicator unit. Rollers 104, carried by frame 106 which depends from frame 94 on either side of the lowermost stretch of belt 80, provide lateral stability for the latter.

Referring now to FIGS. 5 and 6, brush 90 includes a cylindrical hub 108 having an internal bore 110. Hub 108 is mounted on a longitudinally extending shaft 112 which extends outwardly of brush 90 and is journalled in bearing means 114, only one of which is shown in FIG. 5. Shaft 112 is provided with an axially extending bore 116 which is angled at one end to communicate with the interior of bore 110 of hub 108. Electrical conductors 118 are provided in bore 116 of shaft 112 for carrying electrical energy from slip rings 120 carried by shaft 112 to a plurality of circumferentially spaced, longitudinally extending electrical heating units 122 mounted on the interior surface of hub 108. Units 122 are uniformly spaced circumferentially of bore 110 and extend parallel to the axis of rotation of brush 90 so that the latter is maintained in balance during rotation thereof. Electrical contacts or brushes 124 cooperate with slip rings 120 to maintain electrical contact with the units 122 during rotation of brush 90.

Manifestly, heating units 122 may be energized by use of a pair of slip rings 120 and brushes 124. However, if it is desired to utilize thermal sensing structure (not shown) in conjunction with brush 90 for sensing the temperature of the latter, it is desirable to utilize three such slip ring and brush combinations as illustrated in FIG. 5 of the drawings. Further, the slip rings and brushes may be housed in a sealed container 126, only a portion of which is illustrated in FIG. 5. It will be understood that slip rings 120 communicate through electrical conductive means (not shown) with conductors 118 through the outer wall of the bored shaft 112.

Each of the belts 80 and 84 of conveyor 66 and applicator unit 68 respectively, are of a commercially available heat resistant type which may utilize asbestos fibers in the construction thereof. Heaters 128, which may be gas burners, infrared or other electrical heaters, are disposed in thermal exchange relationship with belts 80 and 84 for maintaining the same at a predetermined temperature so that the coating composition carried by the belts may likewise be maintained at a predetermined temperature range as will hereinafter be described.

In carrying out the method of this invention, it has been found that bituminous-based coating material can be applied by impinging the material at high velocity on the outer surface of a rotating object to be coated, such as a joint of pipe or the like, to produce a desirable mastic coating. It is important to this method, however, that the coating material at the time the same is propelled at high velocity toward the outer surface of the pipe to be coated, be in a granular state, yet each of the particles of material should be thoroughly and uniformly coated with a thin coating of the thermoplastic binder material in a highly viscous state. Pipe 70 is ordinarily prepared prior to the application of coating layer 138 by first cleaning the outer surface of the pipe of rust, mill scale and the like by conventional methods such as by shot blasting. In order that the rather critical temperature ranges be maintained at the time of placement of the coating material on the pipe, it has been found advantageous to initially heat or cool the temperature of the pipe by water bath or other suitable means to within a predetermined temperature range which may be about 80° F. to about 90° F. This provides a constant temperature of the object to be coated, which temperature may be below the normal ambient temperatures encountered and the difference in temperature between the coating composition and the temperature of the object to be coated remains substantially constant despite variations in the ambient temperature.

The pipe is then provided with a coating of pipe primer material such as pipe enamel or other suitable preservative as will be known to those skilled in the art. The thickness of the primer coat has been found suitable if it is within the range of about .003 to about .004 inch. Following the primer coat, the outer surface of pipe 70 may then be flooded with a layer of sprayed asphalt or asphaltic-like material to provide for an additional layer to insure bonding of the main coating mass to the pipe. Such layer may have a thickness of about .020 to about .030 inch. This layer 140 (FIG. 3) of asphaltic material provides a cushion coating on the exterior surface of pipe 70 to prevent retrograde bouncing of the coating material when the latter is directed at high velocity against the surface of pipe 70 as hereinafter described. Further, the cushion layer 140 and primer coating serves to enhance the bond between the pipe 70 and the layer 138 of mastic coating material to be applied later. It is contemplated that the temperature of the asphaltic material 140 forming the cushion coat will be within the range of about 225° F. to about 375° F. and preferably at about 250° F. when it is applied to the pipe. At these temperatures, the asphalt is a viscous, relatively thick liquid which may be quickly cooled to effect the bond with the mastic coating material as the latter impinges against the pipe.

The flexibility which is desirable in mastic pipe coatings of the type contemplated by this invention, as well as the protective qualities which are necessary from such coatings, make asphalt a desirable binder material in the mastic composition. However, materials other than asphalt such as commonly available pipe coating enamels, which are usually comprised of an asphalt or coal tar base and appropriate inert mineral fillers or petroleum solvents, may be utilized in conjunction with the other ingredients of the composition which will be subsequently described. Additionally, as will also be more fully explained later, thermosetting resins such as commercially available epoxies may be utilized for the binder material contemplated by the method of this invention, rather than thermoplastic materials such as asphalt and the like.

Since it has been found that successful application of coating materials by the process which causes the materials to become compacted into a dense layer of coating material on the pipe by impingement of the particles against the pipe depends largely upon maintaining the composition in granular state at the time of application, the amounts and viscosity of the thermal responsive binder material must be carefully controlled. If the binder material is present in too great quantities in comparison to the dry ingredients, or if the binder material is too thin, the composition will be sticky and cannot be evenly applied. On the other hand, if each particle is not adequately coated, or if the binder material is not present in sufficient quantities, the compacted mass will not have the cohesive characteristic necessary for establishing a permanent, well bonded coating for the pipe. Further, if the viscosity of the binder material is not proper at the time the granules impinge upon the pipe, the particles will not adhere to one another following such impingement, and a well bonded cohesive coating will not be achieved. Additionally, if moisture is present in the composition, bubbles or blisters will be formed in the coating, resulting in voids and cracking which is intolerable.

Satisfactory mastic coatings have been achieved by utilizing as an ingredient, particulate material in the nature of sand which is first heated to a temperature within a range of about 220° F. to about 250° F. in the drier 12. This insures that all of the moisture is removed from the sand. The sand is then passed through a screen to maintain the maximum particle size across the greatest dimension of each particle within limits calculated to achieve maximum density of the finished product. It is presently contemplated that this dimension will be limited to 1 inch or less and preferably to ⅜ of an inch or less.

Manifestly, the sand could be heated to higher temperatures in the drier if heat loss is contemplated during transfer of the sand to the mixing screw 22. The sand at the temperatures indicated, is combined and blended with a filler material such as lime dust at ambient temperature and a fiber reinforcement material such as asbestos, also at ambient temperature, in quantities wherein the dry ingredients of the mix entering pug mill 38, is at an overall temperature within the range of about 220° F. to about 250° F.

When the binder is asphalt, it is heated to a temperature within a range of about 350° F. to about 400° F. at the time it is sprayed onto the dry ingredients in the pug mill and in quantities sufficient to raise the overall temperature of the composition emanating from the pug mill to a range of about 225° F. to about 270° F. Heaters 128 and the brush heating unit 22 are controlled to maintain the temperature of the admixture within this range until the time that the composition is placed on the object 70. Preferably, the temperature of the admixture is maintained at about 250° F. during this step.

It has been found that the elevating of the temperature of the asphalt to the level described produces a viscosity which is highly suitable for bringing about the thorough coating of each and every particle of sand as the composition is agitated and advanced in the pug mill. However, the substantially lower temperature of the sand brings the viscosity of the binder to a proper level for maintaining the admixture in a granular state while the same is conveyed to the applicator unit and through the latter at high velocity toward impingement on the pipe.

The temperatures heretofore described for producing the desirable viscosity of the binder material contemplate that the binder material be commercially available, suitable grade asphalt and that the mixture be comprised of the quantities of materials hereinafter set forth. Those skilled in the art will recognize that the use of binders of varying viscosity will require corresponding adjustments in quantities and temperatures of the ingredients in accordance with the overall objective of maintaining the admixture in a granular state while insuring a thorough coating of the particles with a binder which is viscous at the time of application to the pipe.

The quantities of materials forming the coating composition may be varied within limits consistent with the overall requirements set by the specifications for the pipe coating. Suitable compositions have been achieved wherein the ingredients, by weight, of the composition have included a binder of asphalt ranging from 5% to 15%, a filler material of lime dust (of the type heretofore utilized in commercially available mastic coatings) ranging from 15% to 35%. The particulate material may comprise sand, crushed limestone, or other aggregate including relatively heavy ore-bearing materials and may be present in quantities ranging from 50% to 70% by weight, of the composition. As heretofore explained, however, it is important that the particulate material be free of moisture and that the greatest dimension of each particle be maintained within limits calculated to achieve maximum density for the coating. It is presently preferred that this dimension be about ⅜ inch or less.

Successful pipe coatings utilizing the method and apparatus of this invention have been achieved wherein the components of the composition by weight have been about 9% grade II asphalt, 27½% lime dust, ½% asbestos fiber, and 63% sand. Densities of as high as 136 pounds per cubic foot and higher have been achieved with the foregoing composition wherein the temperature ranges hereinabove set forth were maintained, and wherein the speed of rotation of the brush 90 and belt 84 were such as to impart a lineal velocity of approximately 5,180 feet per minute to the particles of coating material as the latter are directed against the pipe.

Ideally, the point of convergence between brush 90 and belt 84 should be within a range of about 12 to 36 inches from the outer surface of the pipe 70 to be coated, depending upon the diameter of the pipe. It has been found that if the surface of the pipe is closer than about 12 inches to such point of convergence, the particles have a tendency to bounce excessively from the pipe surface or the layer of coating material on the pipe, thereby detracting from the dense compaction which is necessary for the cohesion of particles in a uniform and well bonded coating. Further, when the point of convergence is at a greater distance from the pipe surface than about 36 inches, the relative momentum between the various sized particles acting through such substantial distance, tends to cause a separation of the larger particles from the fine particles. Again, this prevents formation of a desirable, densely packed and uniform coating.

The outer surface of brush 90 should be maintained perfectly cylindrical if possible. It has been found that it is desirable to periodically grind the bristle ends to maintain such cylindrical shape to insure uniform application of the coating material against the pipe. The best results have been achieved when the brush is adjusted so that the bristle ends terminate approximately ¼ inch above the upper surface of belt 84.

As is the practice in providing concrete coatings for pipe, joints of the latter such as joint 70, are conventionally supported on rollers 130 disposed adjacent each end of the pipe and means (not shown) such as a carriage or the like, is utilized for transporting the pipe longitudinally thereof past the coating application station. Rollers 130 are powered to rotate the pipe as illustrated by the arrows in FIGS. 1 and 2. Longitudinal advancement and axial rotation of the pipe cooperate to insure that the latter is exposed to the stream of coating material delivered by the applicator unit 68 in order to achieve a uniform coating through out the length of the pipe.

If desired, a mesh reinforcement 74 is disposed around feed roller 132 of apparatus 72 and through an adjustable guide 134 for wrapping the mesh 74 around the pipe as the latter rotates. Tension on the mesh 74 may be controlled to embed the same into the coating layer (as illustrated in FIG. 3) for imparting strength to the latter. Apparatus 72 is conventional and, therefore, need not be described in detail.

It has been found that the utilization of reinforcement 74 having mesh openings of approximately ¼ inch diameters, is particularly well suited for asphaltic-based mastic coatings of the type contemplated by this invention. Such relatively small openings and the close spacing of the reinforcement wires or strands resist any tendency for the reinforcement to migrate within the coating layer. This may be a problem where reinforcement having larger openings is utilized, especially before the binder material has hardened.

Reinforcement 74 may be formed from wire as is conventional. However, the possibility of inadvertent contact between the reinforcement and the outer surface of the pipe resulting in galvanomic connection having deleterious effects upon the pipe may be avoided if the wires of reinforcement 74 are provided with an external coating 136 of electrically nonconductive material such as plastic or the like (FIG. 4). The outer coating 136 of plastic insures that no electrical or galvanomic contact is made between the reinforcement 74 and the surface of the pipe even though the reinforcement should inadvertently engage the pipe.

Further, it has been found that a reinforcement 74 constructed of a synthetic resin material having strength characteristics sufficient to impart enhanced structural stability to the coating layer 138 may be utilized. Reinforcement made from a high density polyethylene mesh has proven particularly well suited for this purpose. Such materially is structurally stable up to temperatures as high as 290° F. This exceeds the temperature of the coating material when the latter is applied to the pipe. Nylon mesh has also been found to be well suited for use as the reinforcement.

Although not necessary for many applications, an outer wrap of fiber glass material or felt reinforced by fiber glass, as well as other suitable wrapping materials, may be provided on the exterior surface of coating layer 138 after the same has been applied to the pipe. The outer wrapping may be carried out in any conventional manner utilizing presently available equipment.

Whether or not an outer wrap is provided, it is contemplated that apparatus of any suitable type (not shown) may be provided for spraying a liquid whitewash solution on the outer surface of the coated joint of pipe as a final step in the coating process. This relatively cool solution serves to harden or set the asphalt binder which is in a liquid state so that the coating layer 138 becomes relatively solid. Further, the whitewash gives a heat reflective white outer coating to the layer 138 to retard the softening of the coating when the latter is exposed to the rays of the sun.

Heaters 128 for heating belts 80 and 84 respectively, are required at the outset of operation of the coating apparatus to prevent cooling of the binder to a temperature below that which is necessary for effecting cohesion of the particles as the composition impinges upon the pipe. However, once the apparatus is initially placed in operation, the heat of the ingredients of the composition will normally be sufficient to maintain belts 80 and 84 at temperatures which will permit successful operation of the apparatus even though heaters 128 are then de-energized. Nevertheless, heaters 128 would again be utilized should it become necessary to interrupt operation, thereby insuring that the method could be instantly resumed with the binder maintained at the required temperature. It has been found that brush 90 should be provided with additional heat throughout operation of applicator unit 68 because such binder material as tends to become lodged in the bristles of brush 90 has a tendency to congeal within the bristles as the latter are rotated through the air. The heat keeps the binder material in a liquid state so that it is thrown from the bristles and renders the same self-cleaning.

The binder material chosen for carrying out the principles of this invention need not be limited to asphalt or to thermoplastic materials. Thus, the binder material may comprise thermal responsive materials such as epoxies. Epoxy binders are added to the composition in the pug mill 38 in the vicinity of spray bar 60, it being understood that the use of epoxy binders eliminates the necessity for the binder heater 52. Instead, suitable conveying and dispensing apparatus (not shown) is utilized for metering the binder material into the pug mill.

The sand is, however, preheated as described above and the temperature of the sand serves to liquify the epoxy material while the ingredients of the composition are thoroughly mixed in the pug mill. The temperature of the composition emanating from outlet 48 is preferably within a range of about 240° F. to 250° F.

Those skilled in this art will recognize that the curing time for epoxy materials is a function of the temperature of the materials and that other suitable temperatures could be chosen. However, composition temperatures of about 250° provide a curing time for the binder material in the order of about ten minutes, which time has proven to be satisfactory to permit placement of the composition onto the pipe and subsequent hardening of the mass as required to provide a suitable coating.

Belts 80 and 84 may be heated as described above in connection with a composition utilizing a thermoplastic binder, all to the end of insuring the thorough coating of each particle with binder material which is sufficiently viscous to be compacted when placed upon the pipe by applicator unit 68. It remains a very important feature of this method that the composition remain in a granular state, even though each particle is coated with binder material, as the composition passes through applicator unit 68. Whereas the precise temperature necessary to achieve this objective may obviously vary depending upon the particular binder material utilized and the speed at which the composition is moved through the mixing and transporting stages culminating in placement of the composition upon the pipe, the selection of suitable temperature, speed and material combinations to achieve these objectives will be within the ability of those skilled in this art.

Curing of the thermosetting epoxy binder material in the composition after the same has been applied to the pipe produces a highly satisfactory coating for the pipe. As with asphaltic based mastic coatings, the coatings are anticorrosive and are flexible to an extent necessary for withstanding normal stresses encountered in most pipe laying operations.

Having thus described the invention, what is claimed as new and desired to be secured by Letters Patent is:

1. A method of coating a rotating pipe with a corrosion protecting, relatively heavy composition containing a particulate material and an asphaltic binder, said method comprising the steps of:
raising the temperature of said binder to liquify the same;
raising the temperature of said particulate material to at least about 220° F.;
adding said heated particulate material to the binder and admixing the same;
maintaining the binder liquified by continually applying heat while mixing the binder and the particulate material;
continuing said mixing step until each particle of the particulate material is substantially coated with said liquified binder, and until the resulting composition reaches a generally granular state;
applying a yieldable layer of asphaltic material onto said pipe while the temperature of said asphaltic material is within a range of about 225° F. to 375° F.;
projecting the granular composition while maintaining the binder liquified at a relatively high velocity against said yieldable layer with an impactive force to effect cohesive binding of the particles to one another and to the layer, until a relatively dense, compacted coating of the composition surrounds the pipe; and
cooling said compacted coating following application of the coating to the pipe.

2. The method of claim 1, wherein said layer of yieldable asphaltic material is applied until it is about .020 to .035 inch thick.

3. The method of claim 1, wherein is included the step of bringing the temperature of said pipe to within a predetermined temperature range and below the liquifying temperature of said binder prior to the placing of said composition onto the pipe.

4. The method of claim 3, wherein the temperature of said pipe is brought to within a range of about 80° F. to about 90° F.

5. The method of claim 1, wherein the greatest dimension of the particles of said material are maintained at a maximum of about 1 inch.

6. The method of claim 1, wherein the greatest dimension of the particles of said material are maintained at a maximum of about ⅜ inch.

7. The method of claim 1, wherein prior to admixing of the binder and particulate material said binder is raised to a temperature within a range of about 350° F. to about 400° F. and the particulate material is raised to a temperature within a range of about 220° F. to about 250° F.

8. The method of claim 7, wherein is included the step of adding to said composition a filler material at ambient temperature prior to admixing the binder, particulate material and filler material.

9. The method of claim 8, wherein is included the step of adding to said composition a quantity of fiber material prior to admixing of said filler, particulate material and asphalt.

10. The method of claim 9, wherein the quantities by weight of materials which are admixed to comprise said composition are about: 5 to 15% asphalt, 15 to 35% lime dust, ½% asbestos, and 50 to 70% sand.

11. The method of claim 9, wherein the quantities by weight of materials which are admixed to comprise said composition are about: 9% asphalt, 27½% lime dust, ½% asbestos, and 63% sand.

12. The method of claim 1, wherein is included the step of applying a coating of whitewash on the outer surface of the compacted coating.

13. The method of claim 1, wherein is included the step of embedding an electrically nonconductive mesh reinforcement in the granular composition as the latter is placed by impactive force on the object.

14. The method of claim 13, wherein said reinforcement is formed of polyethylene material.

15. The method of claim 13, wherein said reinforcement is formed of nylon material.

16. A method of coating an elongated pipe with a corrosion protecting, relatively heavy composition including about 65% to 95% mineral aggregate and about 5% to 15% asphalt, said method comprising the steps of:
heating the pipe to a predetermined initial temperature below the melting point of the asphalt;
heating the asphalt to a temperature within the range of about 350° F. to about 400° F. and sufficient to liquify the asphalt;
heating said aggregate to a temperature of at least 220° F.;
admixing said heated aggregate and liquified asphalt to effect substantial coating of each aggregate particle;
continually applying heat to said asphalt and aggregate while mixing the same to maintain the asphalt in a liquid state;
continuing said mixing step until the mixture reaches a generally granular state;
applying a primer coat of liquid asphaltic material of a thickness of about .004 inch or less to the pipe;
applying a cushion layer of liquid asphalt at about 225° F. to about 375° F. and of a thickness of about .030 inch or less over said primer coat;
applying a moving force to said granular mixture to accelerate the mixture to a relatively high velocity directed toward said cushion layer;
applying heat to the mixture simultaneously with the application of said moving force to maintain the asphalt in the mixture in a liquid state;
projecting said granular mixture while at said high velocity against said cushion layer and against preceding granules of said mixture, thereby compacting the mixture into a dense coating on the pipe;
rotating said pipe on its longitudinal axis and translating the pipe longitudinally while projecting the mixture toward the pipe to achieve a uniform coating of said compacted mixture surrounding the pipe; and cooling said coating following application of the coating to the pipe.

References Cited

UNITED STATES PATENTS

| | | | |
|---|---|---|---|
| Re. 17,985 | 3/1931 | Radcliffe | 117—27 |
| 296,228 | 4/1884 | Schulze-Berge | 117—18 |
| 414,246 | 11/1889 | Phillips | 117—32 |
| 1,881,345 | 10/1932 | Beatty | 117—27 |
| 2,276,485 | 3/1942 | Harshberger | 117—27 |
| 2,787,557 | 4/1957 | Christensen et al. | 117—94 X |
| 2,978,351 | 4/1961 | Pullar | 117—27 X |
| 3,026,568 | 3/1962 | Moar | 117—100 X |
| 3,036,931 | 5/1962 | Kell | 117—94 |
| 3,168,411 | 2/1965 | Walsh | 117—26 |
| 3,249,307 | 5/1966 | Peeps et al. | 117—27 |
| 3,108,022 | 10/1963 | Church | 117—21 |

FOREIGN PATENTS

| | | |
|---|---|---|
| 218,410 | 7/1924 | Great Britain. |

WILLIAM D. MARTIN, Primary Examiner

W. R. TRENOR, Assistant Examiner

U.S. Cl. X.R.

117—23, 27, 32, 94, 105.1, 105.4; 156—195, 213